United States Patent
Owens

(10) Patent No.: US 7,785,448 B2
(45) Date of Patent: Aug. 31, 2010

(54) METHOD AND APPARATUS FOR PHASE CHANGE ENHANCEMENT

(75) Inventor: Kingston Owens, Bedford, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 1167 days.

(21) Appl. No.: 11/073,935

(22) Filed: Mar. 7, 2005

(65) Prior Publication Data

US 2005/0183832 A1    Aug. 25, 2005

Related U.S. Application Data

(63) Continuation-in-part of application No. 10/636,303, filed on Aug. 7, 2003, now abandoned.

(60) Provisional application No. 60/401,813, filed on Aug. 7, 2002, provisional application No. 60/425,820, filed on Nov. 13, 2002.

(51) Int. Cl.
*B01D 1/06* (2006.01)
*B01D 1/22* (2006.01)
*B01D 3/04* (2006.01)
*B01D 3/28* (2006.01)
*C02F 1/08* (2006.01)
*C02F 1/16* (2006.01)

(52) U.S. Cl. ............... 203/10; 159/13.2; 159/24.2; 159/26.1; 159/27.1; 159/49; 202/236; 202/237; 203/26; 203/27; 203/89; 203/DIG. 8

(58) Field of Classification Search ............. 159/13.2, 159/24.2, 26.1, 27.1, 49; 202/236, 237; 203/10, 203/26, 27, 89, DIG. 8

See application file for complete search history.

(56) References Cited

U.S. PATENT DOCUMENTS

| | | | | |
|---|---|---|---|---|
| 3,724,523 A | * | 4/1973 | Mattern | 159/13.2 |
| 3,789,617 A | * | 2/1974 | Rannow | 62/115 |
| 3,846,254 A | * | 11/1974 | Sephton | 203/11 |
| 3,950,216 A | | 4/1976 | Bruns | 159/13 |
| 4,636,283 A | | 1/1987 | Nasser | 202/173 |
| 5,558,687 A | | 9/1996 | Cain | 55/233 |
| 5,795,446 A | * | 8/1998 | Kirschmann | 203/49 |
| 5,971,061 A | * | 10/1999 | Li | 165/94 |

(Continued)

FOREIGN PATENT DOCUMENTS

GB        607290        8/1948

(Continued)

OTHER PUBLICATIONS

Daripa, Prabir, "Pointed Taylor Bubble Revisited", *Journal of Computational Physics* 123, 226-230 (1996), Article No. 0018.

(Continued)

*Primary Examiner*—Virginia Manoharan
(74) *Attorney, Agent, or Firm*—Michelle Saquet Temple

(57) ABSTRACT

A method of operating an evaporator is described. In evaporator feed water, a Taylor bubble is developed which has an outer surface including a thin film in contact with an inner surface of an outer wall of an evaporator tube. The Taylor bubble is heated as it rises within the evaporator tube so that liquid in the thin film transitions into vapor within the bubble.

4 Claims, 8 Drawing Sheets

U.S. PATENT DOCUMENTS

| | | |
|---|---|---|
| 6,254,734 B1 | 7/2001 | Sephton .......................... 203/2 |
| 6,291,708 B1 | 9/2001 | Cockrem .................... 562/589 |
| 2006/0101848 A1* | 5/2006 | Taras et al. .................... 62/515 |

FOREIGN PATENT DOCUMENTS

| | | |
|---|---|---|
| GB | 860689 | 2/1961 |
| GB | 919897 | 2/1963 |
| GB | 1086012 | 10/1967 |

OTHER PUBLICATIONS

Lee, P.C., et al., "Nucleate Boiling Heat Transfer in Silicon-based Micro-channels", *eInternational Symposium on Nanotechnology and Energy*, Hsinchu, Taiwan, ROC Apr. 24, 2004.

Wadekar, Vishwas, "Compact Exchangers for Phase Change", http://docenti.ing.unipi.it/exhft5/wadekar.pdf.

Riethmuller, M. L., "Bubble Dynamics and Slug Flows", http://euroturbo.org/research/themes/annualsurvey/_2002/bubble_dynamics_ea1003v1.pdf.

* cited by examiner

METHOD AND APPARATUS FOR PHASE CHANGE ENHANCEMENT

The present application claims priority from United States Publication No. US-2004-0074757-A1, published Apr. 22, 2004 and entitled Method and Apparatus for Phase Change Enhancement, now abandoned, which in turn claimed priority from U.S. provisional patent application Ser. No. 60/401,813, filed Aug. 7, 2002, entitled "Method and Apparatus for Boiling Enhancement in a Rising Film Evaporator," and from U.S. provisional patent application Ser. No. 60/425,820, filed Nov. 13, 2002, entitled "Pressurized Vapor Cycle Liquid Distillation." Each of these applications is incorporated herein by reference in its entirety.

FIELD OF THE INVENTION

The present invention pertains to improvements for the conversion of liquid to vapor, such as the phase change that takes place in an evaporator.

BACKGROUND ART

The conversion of liquid to vapor is a fundamental step in many processes. For a variety of reasons, such as time and energy limitations, it may be advantageous to make this phase change more efficient. For example, one method of achieving more efficient phase change is though the use of thin film evaporation.

Rising film evaporation is one form of thin film boiling. When water boils at a high enough rate in a vertical tube, the central area of the tube fills with steam. As shown in FIG. 8, under the right conditions, the upward movement of the steam will rapidly draw a thin film of water up the inside of the tube forming a natural thin film on the inner wall of the tube. As the feed mixture moves up the inside of the tube, more vapor is formed resulting in a higher central core velocity that forces the remaining liquid to the tube wall. Higher vapor velocities, in turn, result in thinner and more rapidly moving liquid film. But very accurate feed water level control (e.g., ±0.25") is needed to achieve this mode of operation. Such accurate level control in a portable system may be difficult to achieve because the system would have to be leveled to within 1° of tilt.

Thin film evaporation is typically achieved using apparatus that includes devices with very small openings or very small spraying arrangements. This apparatus can easily clog, particularly when the source liquid contains contaminants. The apparatus may also be sensitive to movement and positioning of the apparatus. What is needed is an invention that allows for an increase in the phase change efficiency similar to the efficiencies obtainable from thin film evaporation, without the limitations and sensitivities typically experienced with thin film evaporation.

For example, vapor compression distillation has proved useful for purifying liquids, e.g., turning salt water into potable water. Such devices frequently employ an evaporator chamber comprising a set of vertically oriented tubes, which tubes are heated on their exteriors. The heated tubes create vapor from a liquid that is input to the tubes through openings in the bottom of the tubes. The vapor that emerges from each tube is compressed and heat from the vapor is then transferred to the liquid in the tubes by passing the compressed vapor over the outside of the tubes. The vapor condenses as it transfers its heat and the resultant distillate is drawn off. A vapor compression distillation device is disclosed in The Naval Sea Systems Command (Sea-03Z43), Naval Ships' Technical Manual, Chapter 531, Desalination Volume 2, Vapor Compression Distilling Plants, # S9086-SC-STM-020/CH-531V2R2, 1 Sep. 1999, which is incorporated herein by reference in its entirety. The efficiency of a rising film evaporator can be characterized by the ratio of distillate output per unit time to the power input to the evaporator per unit time.

In this specification and in any appended claims, unless context requires otherwise, the term "phase change chamber" will mean any structure with at least one inlet end for introducing liquid and at least one outlet end for allowing vapor to exit. The chamber is intended to be heated externally and to allow a liquid-to-vapor phase change to occur within. Such chambers include, without limitation, evaporator tubes, that may be cylindrical, and the parallel core layers described above. Other geometries as are known for such chambers to those skilled in the art are intended to be within the scope of the invention as described in the claims.

SUMMARY OF THE INVENTION

In accordance with embodiments of the present invention, an improvement is provided for devices that convert liquid to vapor, such as evaporators. In evaporator feed water, a Taylor bubble is developed which has an outer surface including a thin film in contact with an inner surface of an outer wall of an evaporator tube. The Taylor bubble is heated as it rises within the evaporator tube so that liquid in the thin film transitions into vapor within the bubble.

In a further embodiment, the evaporator tube includes a internal center rod to form an annular cylinder space within the evaporator tube so that an annular Taylor bubble is developed. The evaporator tube may further include an internal spiral wire adapted to maintain the center rod in position within the evaporator tube. The thin film in contact with the inner surface of the of the outer wall of the evaporator tube is typically much thinner for an annular Taylor bubble than for a cylindrical Taylor bubble.

In a further embodiment, heating the Taylor bubble includes heating the outside of the evaporator tube, for example, using compressed vapor from within the evaporator. The compressed vapor may also be cooled to form condensed distillate output of the evaporator.

Embodiments of the present invention also include an evaporator adapted to use any of the foregoing methods.

DETAILED DESCRIPTION OF SPECIFIC EMBODIMENTS

Various embodiments of the present invention are directed to techniques for enhancing the efficiency of phase change for liquids, such as in an evaporator. As used in this application, the term "boiling" will be understood to include a phase change between liquid and vapor where no bubbles are formed, as well as a phase change where bubbles are formed.

Figure 1:
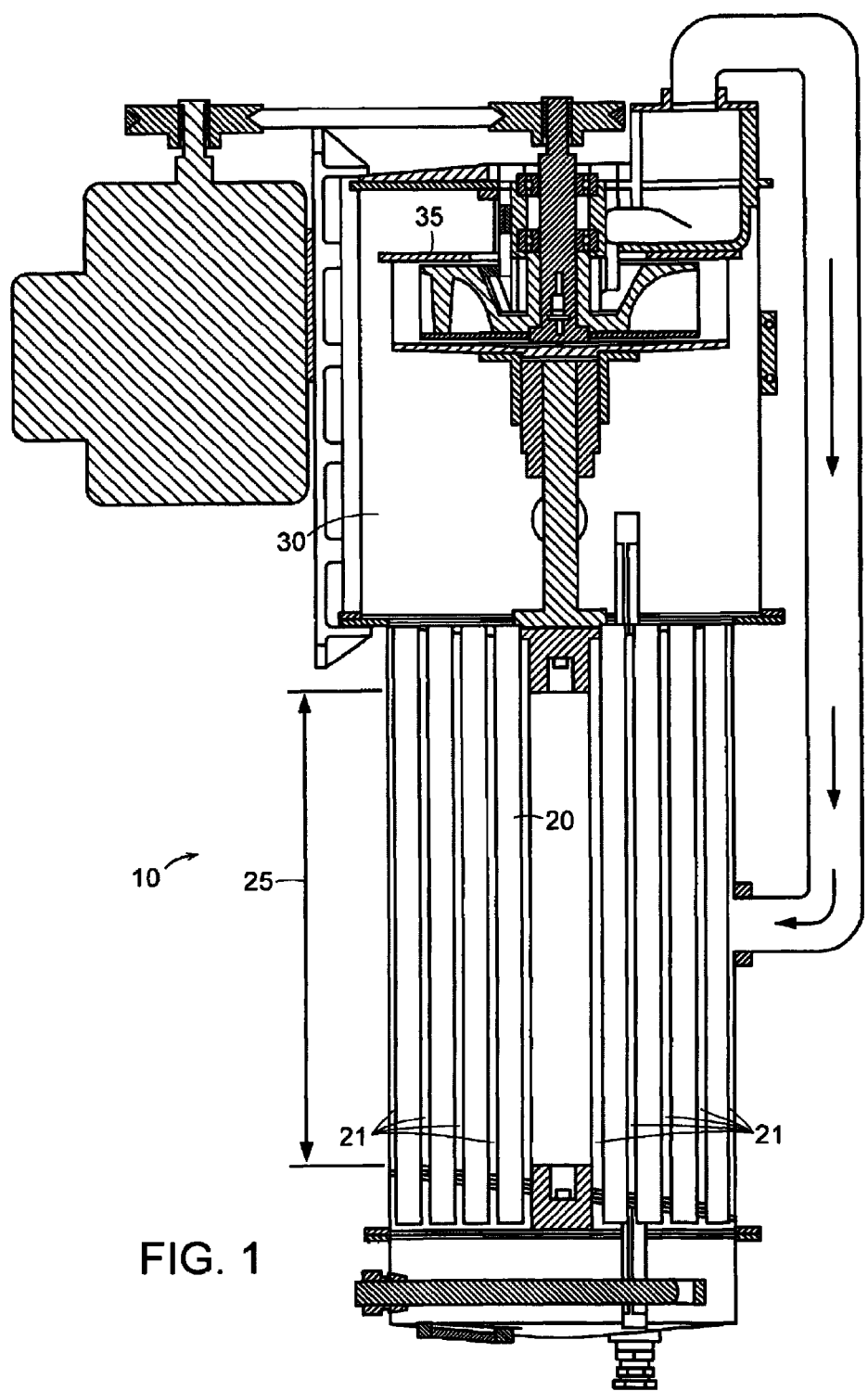
FIG. 1 shows a tube-type evaporator.

FIG. 1 shows an evaporator 10 for distilling a liquid according to an embodiment of the present invention. The evaporator includes a set 20 of cylindrical evaporator tubes 21 that are substantially vertically oriented. Liquid is introduced to each tube through an inlet at the bottom of each tube. Each tube includes a heated central region 25 for boiling the liquid and producing vapor. Each tube has a vent opening that allows vapor to escape from the tube into an evaporation chamber 30. Liquid that has not undergone phase change also escapes through the vent opening into the chamber where the liquid may be recirculated to the tube inlets or removed from the device.

The central region of the evaporator tubes may be heated by any of several means. One means is by compressed vapor, e.g. steam, in contact with the exterior of each tube. A compressor 35, which may be a liquid ring compressor, compresses vapor drawn from the evaporation chamber 30, raising the vapor's pressure and temperature. The compressed vapor is channeled to the exterior of the evaporator tubes in the central region. The compressed vapor condenses around the evaporator tubes thereby heating the liquid in the tubes to boiling. The distillate from the condensed vapor is then drained off.

Figure 2:
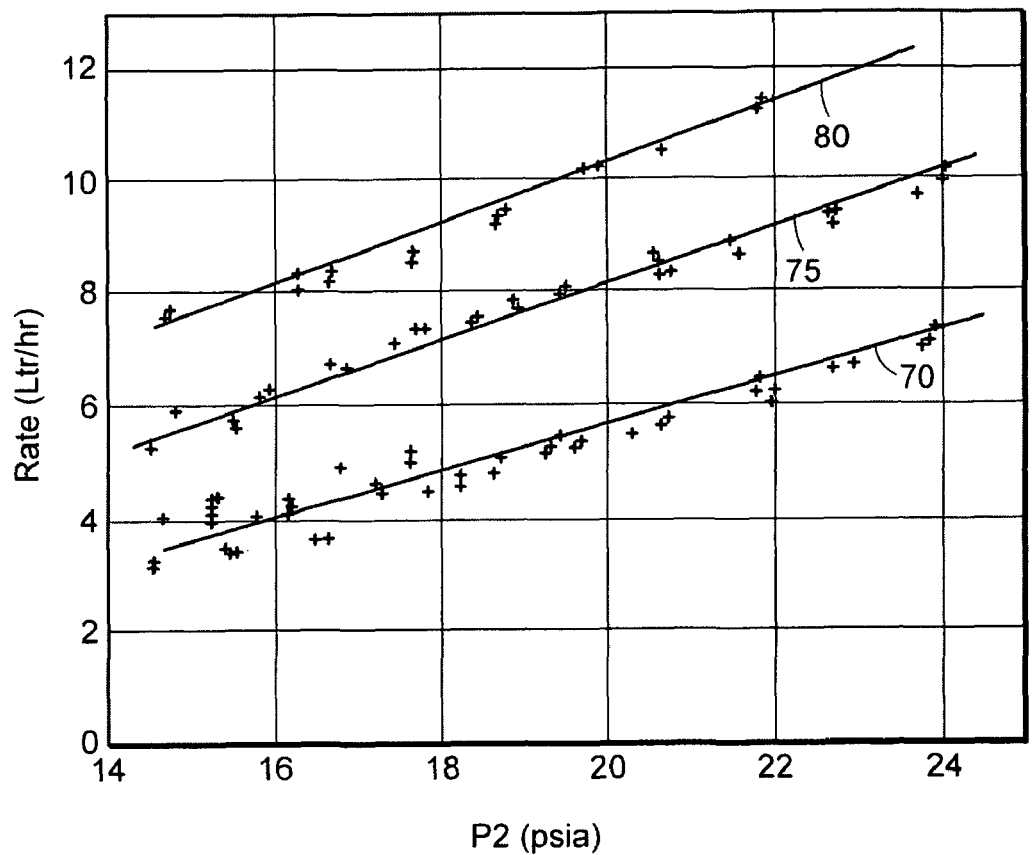
FIG. 2 shows the rate of distillate output for an evaporator as a function of pressure for several liquid boiling modes.

Typically, an evaporator may operate in either of two modes: pool boiling mode or thin film mode. In thin film boiling, a thin film of liquid is created on the inner wall of the tubes facilitating heat transfer from the tube wall to the free surface of the liquid. The efficiency of phase change typically increases for thin film mode as compared to pool boiling mode. FIG. 2 shows the difference in the rate of distillate production as a function of condenser pressure for pool boiling and thin film boiling under similar conditions for a representative evaporator. The bottom curve 70 corresponds to pool boiling while the middle curve 75 corresponds to thin film boiling. As will be noted from these two curves, thin film boiling mode offers significantly higher efficiency than pool boiling mode. Thin film boiling is more difficult to maintain than pool boiling, however. Thin film evaporation is typically achieved using apparatus that includes very small openings. This apparatus can easily clog, particularly when the source liquid contains contaminants. Additionally, in thin film mode the water level is typically held just marginally above the tops of the tubes in a vertical tube-type evaporator. For reasons such as this, the apparatus may also be sensitive to movement and positioning of the apparatus.

Improved efficiency of a phase change operation is achieved in accordance with embodiments of the present invention by providing packing within the evaporator tubes 21. The introduction of such packing may allow the evaporator to take on some of the characteristics of thin film mode, due to the interaction between the liquid, the packing and the heating tube. The packing may be any material shaped such that the material preferentially fills the volume of a tube near the tube's longitudinal axis versus the volume near the tube's interior wall. Such packing material serves to concentrate the vapor near the walls of the tube for efficient heat exchange. For example, in an embodiment of the present invention shown in FIG. 3, the packing may comprise a rod 40 or a plurality of rods inserted into an evaporator tube 21. Each rod 40 may be of any cross-sectional shape including a cylindrical or rectangular shape. The cross-sectional area of each packing rod 40 may be any area that will fit within the cross-section of the tube. The cross-sectional area of each rod may vary along the rod's length. A given rod may extend the length of a given evaporator tube or any subset thereof.

Each rod may be positioned anywhere within the tube including preferentially in the upper portion of the tube. In a specific embodiment, each rod is approximately half the length of the associated tube and is positioned approximately in the top half of the tube. A given rod may be made of any material including, for example, a metal, nylon, Teflon or plastic and in certain embodiments may be hydrophobic. The top curve 80 in FIG. 2 shows the increase in boiling efficiency for thin film boiling for a representative evaporator where the evaporator tubes include packing material in approximately the top half of the tubes. With such packing, the phase change efficiency is also, advantageously, much less sensitive to changes in the liquid level above the tubes, the orientation of the tubes with respect to the vertical, the feed pressure for the tubes and other operating parameters for the evaporator.

Figure 4:
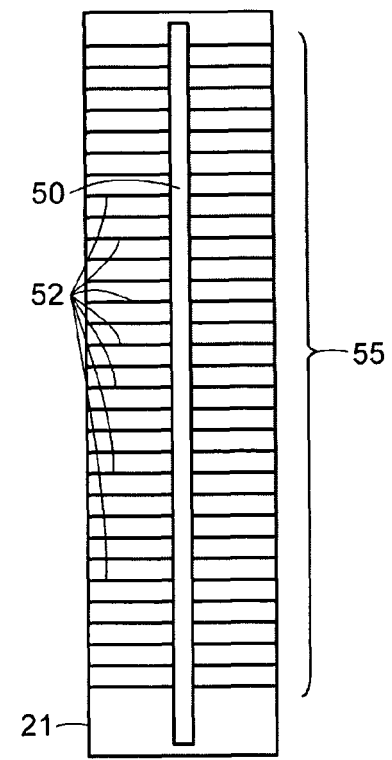
FIG. 4 illustrates an evaporator tube incorporating a brush as packing to enhance boiling of a liquid in a rising film evaporator.

In a specific embodiment of the present invention, as shown in FIG. 4, the packing is in the form of a rod 50 with bristles 52 emanating therefrom, forming a brush 55. The length of the bristles is determined so that a subset of the bristles contacts the inner surface of the tube, when the brush 55 is inserted into the tube. As used in this description and in any appended claims, the word "subset" shall include both proper subsets and a subset that includes every member of the set in question. The brush inserted in any given tube may extend the length of the tube or any portion thereof. Each brush may be positioned anywhere within the tube including at the upper end of the tube. In a specific embodiment, each brush is approximately half the length of the associated tube and is positioned approximately in the top half of the tube. In another embodiment of the invention, the brush is positioned and the length of the bristles is such that none of the bristles contact the evaporator tube wall. In other embodiments of the invention, the packing may be a mesh or other loose packed material.

Figure 5:
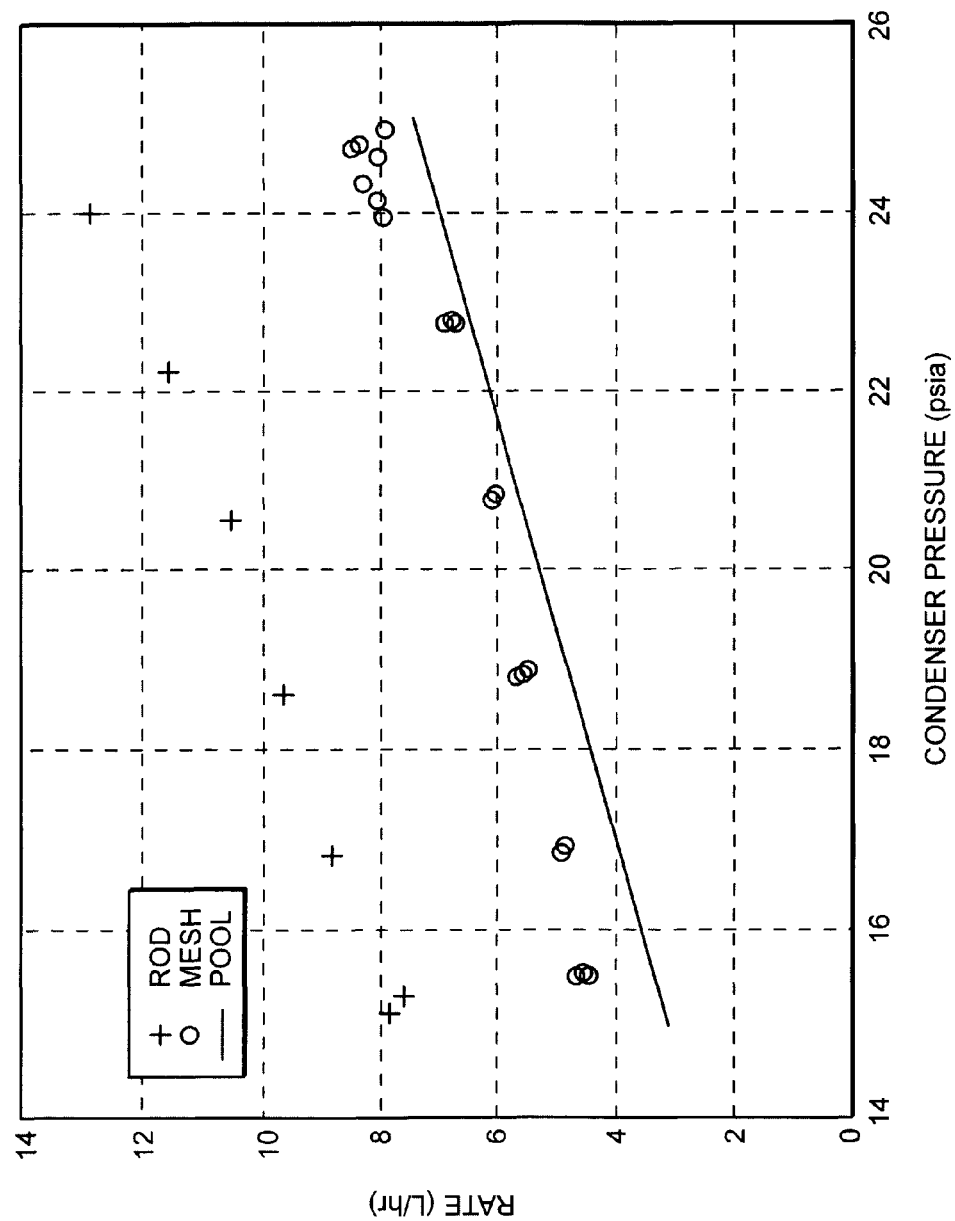
FIG. 5 shows a comparison of the rate of distillate output as a function of pressure for an evaporator for pool boiling and for a tube with rod and wire mesh packing.
Figure 6:
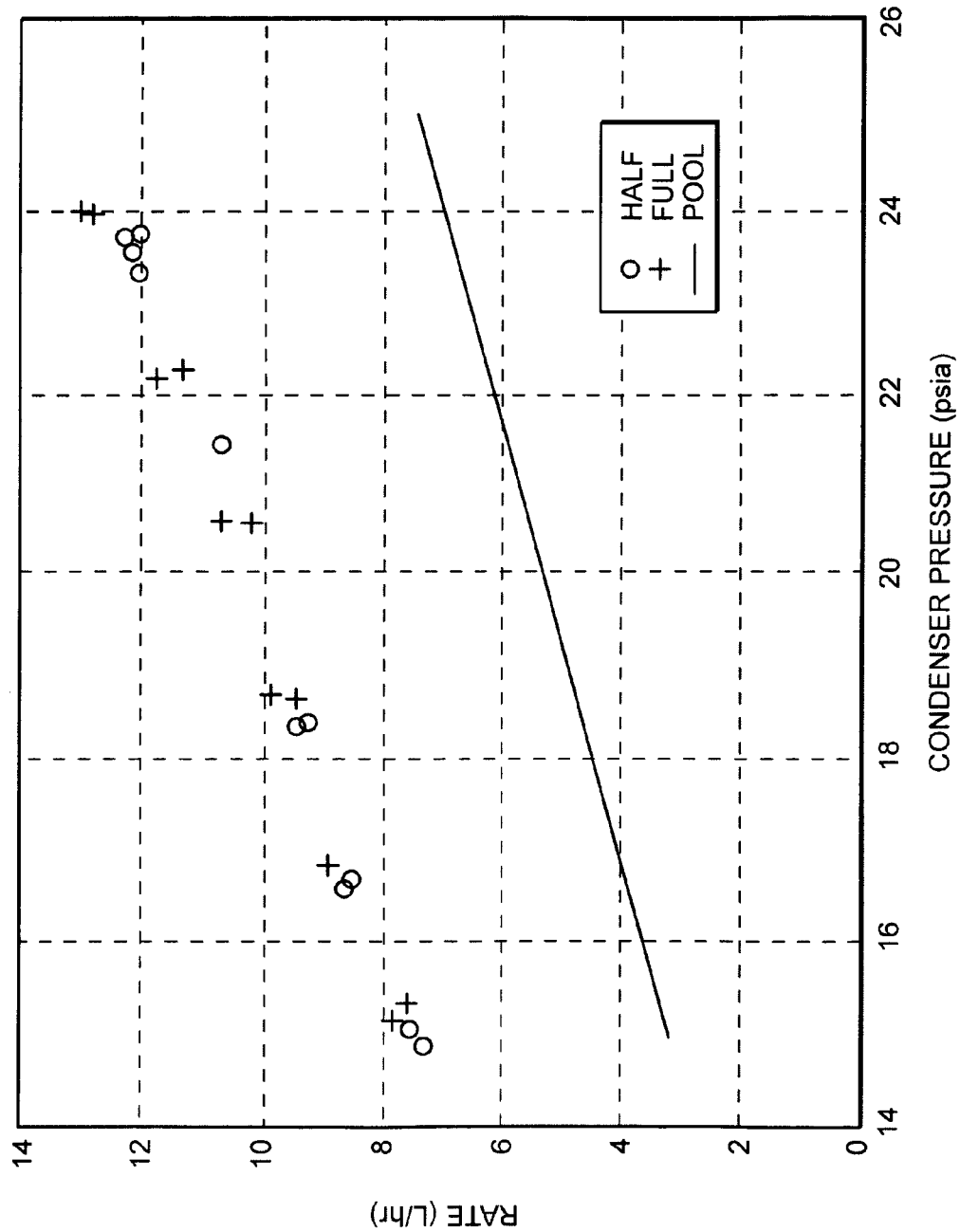
FIG. 6 shows a comparison of the rate of distillate output as a function of pressure for an evaporator for pool boiling and for a tube with full and half packing.
Figure 7:
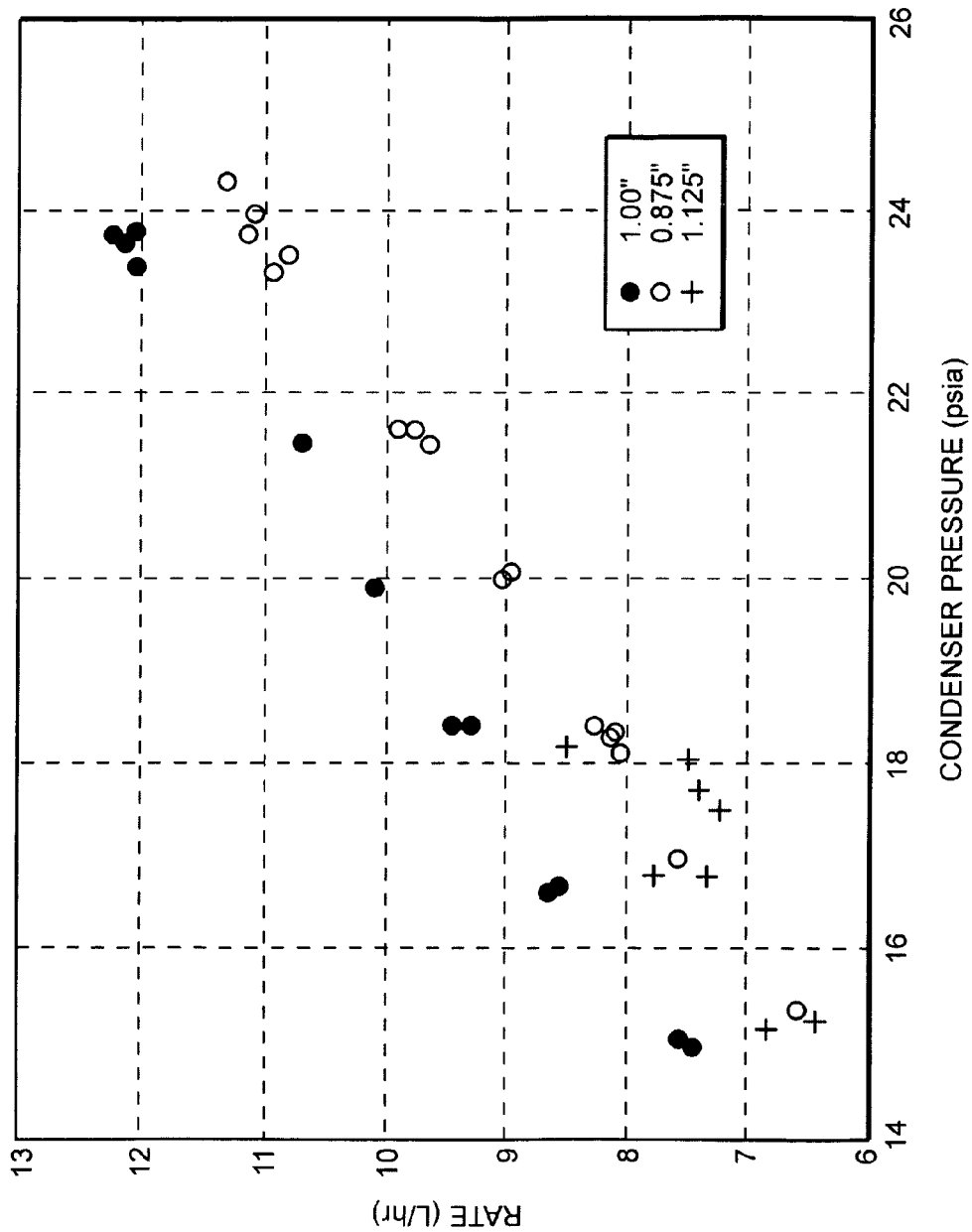
FIG. 7 shows a comparison of the rate of distillate output as a function of pressure for tubes packed with rods of varying diameters.

As an example, an evaporator was built with 10 tubes, with each tube 1.25 inches in diameter and 18 inches in length. The distillation rate as a function of condenser pressure was measured with a variety of packing in the evaporator tubes. For example, FIG. 5 shows the distillation rate for no packing in the tubes (i.e., pool boiling mode) for a mesh packing which completely filled the tube and for packing consisting of rods. The graph clearly shows that the rod packing significantly enhanced the output rate of the evaporator as compared to pool boiling while the mesh provided a much less significant improvement in output rate as compared to pool boiling. FIG. 6 compares the output for evaporator tubes with a rod inserted for its full length and with a rod inserted for half of its length. As can be readily seen, the output rate appears to be insensitive to the length of the rods in these two cases. Finally, FIG. 7 shows the results from inserting rods with 0.875 inch, 1.00 inch and 1.125 inch diameters respectively into the upper half of the evaporator tubes. As can be seen, the output is maximized for the intermediate diameter rod (1.00 inch). This phenomenon may be due to the intermediate diameter rod allowing the flow rate of steam past the rod to be increased as compared to the smallest rod (0.875 inch), while avoiding the restricted flow past the rod that the largest rod (1.125 inch) may provide.

In other embodiments, the evaporator or condenser may include formats other than tubes, such as the flat evaporator/condenser disclosed in U.S. provisional patent application Ser. No. 60/425,820, filed Nov. 13, 2002, entitled "Pressurized Vapor Cycle Liquid Distillation," incorporated herein by reference in its entirety. Such flat evaporator/condensers typically contain multiple parallel core layers, with rib sections creating channels for directing steam and condensed liquid flow. In this embodiment, the improvement comprises inserting packing material inside a given evaporator layer to improve the net rate of phase change. The packing may be any material suitable for use with the given liquid under the conditions typically found in an evaporator and may be placed along the entire length of the evaporator layer or any portion thereof. In this embodiment, the packing may be shaped such that the material preferentially fills the center of the evaporator layer and may be of any thickness less than the thickness of the evaporator layer. The packing may be any solid or hollow shape or may comprise a rod with a plurality of bristles emanating from the rod. In a specific embodiment, the length of the bristles is set so that at least a subset of the bristles contact both the upper and lower surface of the evaporator layer. In another embodiment, the packing material may be a loosely packed material, such as wire mesh, inserted into the evaporator layer.

In yet another embodiment of the invention, rather than inserting packing material into an evaporator tube or a flat layer of an evaporator/condenser, the evaporator may be fabricated to achieve similar results with respect to increased efficiency. For example, in an evaporator containing substantially vertical tubes, the tubes may be formed with a permanent cylindrical section, similar to a rod, placed in the center of the tube. Additionally, for example, a flat evaporator/condenser may be formed with plates that are placed at appropriately spaced intervals to achieve a similar result to the use of packing materials.

Figure 3:
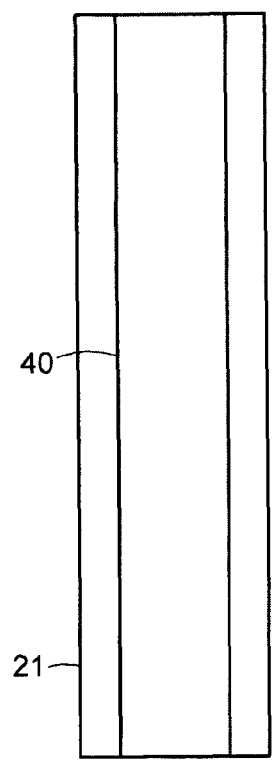
FIG. 3 illustrates an evaporator tube incorporating a rod as packing to enhance boiling of a liquid in a rising film evaporator.

An embodiment based on a tube with a center cylindrical rod (as shown in FIG. 3) may use a process based on what is referred to as slug flow based on formation of large bullet shaped vapor (Taylor) bubbles in the incoming feed water that fill most of the inner tube cross section. Because of the center rod inside the tube, these vapor pockets will actually be in the form of annular Taylor bubbles.

Figure 8:
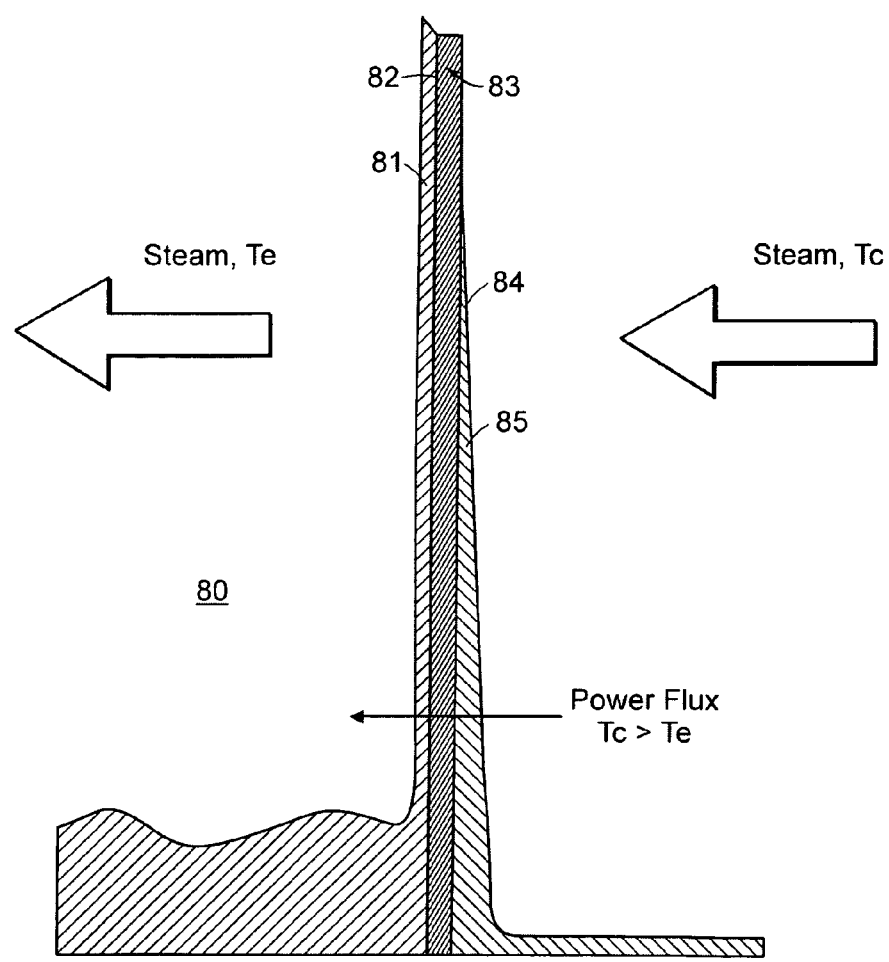
FIG. 8 illustrates the heat flow principles in embodiments that use slug flow of the feed water based on Taylor bubbles.

As shown in FIG. 8, as an individual Taylor bubble 80 rises vertically within the tube, a thin film 81 forms the outer boundary of the bubble and flows in contact with the inner surface 82 of the outer tube wall 83. And in the embodiment shown in FIG. 8, the outer surface 84 of the outer tube wall 83 is heated by compressed vapor at a temperature above the transition temperature of the inner thin film 81. The loss of heat energy from the compressed vapor external to the tube causes it to condense forming a film of liquid distillate 85 which falls along the outer surface 84 of the outer tube wall 83. Thus, there is a power flux from the outer surface 84 of the outer tube wall 83 (in contact with the condensing compressed vapor) across the outer tube wall 83 to its inner surface 82 (in contact with the inner thin film 81 of the Taylor bubble 80). As the Taylor bubble 80 rises within the tube, the thin film 81 is heated by the inner surface 82 of the outer tube wall 82 it contacts. This causes the fluid that forms the thin film 81 to transition to vapor which adds to the vapor that forms the Taylor bubble 80. Although the thin film 81 of the Taylor bubble 80 is relatively thin, the upward flow velocity of the bubble 80 is lower than what is required for the rising film form of distillation.

Slug flow based on Taylor bubbles can be the principle used in an evaporator system such as the one shown in FIG. 1. For example, there may be 85 cylindrical evaporator tubes 21 in the set 20 of tubes. In one specific embodiment, the entire set 20 carries 15 g/sec of feed water, which is a relatively low flow rate of the type that promotes laminar flow along the various internal surfaces of the tubes. Each tube 21 contains an internal center rod 40 as is shown in FIG. 3 so that the interior of each tube forms an annular cylinder. In such a structural geometry, the slug flow mode will form annular Taylor bubbles. Experimental observations indicate that the thin film 81 is dramatically thinner for an annular Taylor bubble than for other shapes. Such very thin films exhibit significantly better heat transfer characteristics and vapor formation qualities than thicker films, and it is therefore an important aspect of embodiments of the present invention that the Taylor bubble be annular shaped in order to achieve the necessary thinness of the fluid film around the bubble.

Figure 9:
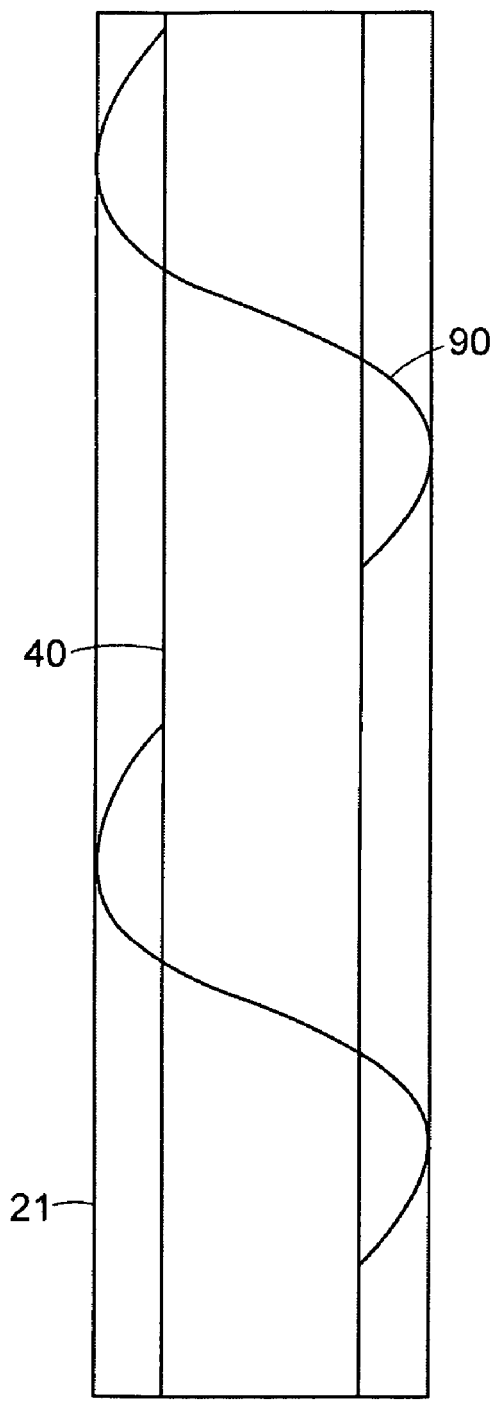
FIG. 9 shows an evaporator tube having an internal spiral wire to maintain the position of a center rod.

In some embodiments, there may further be within each tube 21 a loose spiral wrap wire 90 as shown in FIG. 9. This may help to keep the center rod 40 centered within the tube 21 while not interfering with the slug mode and Taylor bubble process. In other embodiments, the center rod 40 may include a series of external vanes that help keep the rod centered within the tube 21, but such an arrangement might interfere with Taylor bubble process, for example by dividing the annular cylinder so as to prevent a single annular bubble from forming across a given cross section of the tube 21.

And as before, the central region 25 may be heated by compressed vapor drawn from the evaporator chamber 30 which both raises the temperature of the feed water flowing through the inside of the tubes 21 in slug flow mode with Taylor bubbles, and also lowers the temperature of the compressed vapor which condenses into the desired distillate, which forms the output of the evaporator 10.

In specific embodiments of the present invention, the incoming feed water has high overall fluid enthalpy and is near the transition point from liquid to vapor. Thus, there is only a small temperature gradient along the length of the tube. And there may also be only a small temperature gradient across the condensing film, the thickness of the tube from the outer surface to the inner wall, and across the evaporating film to the free surface of the film around the bubble. As a result, such embodiments are highly efficient so that minimum power is required to produce the desired distillate.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of operating an evaporator, the method comprising:
   in evaporator feed water, developing a Taylor bubble having an outer surface including a thin film in contact with an inner surface of an outer wall of an evaporator tube;
   heating the Taylor bubble as it rises within the evaporator tube so that liquid in the thin film transitions into vapor within the bubble,
   providing the evaporator tube with an internal center rod to form an annular cylinder space within the evaporator tube so that an annular Taylor bubble is developed; and
   further providing the evaporator tube with an internal spiral wire wherein the internal spiral wire maintains the center rod in position within the evaporator tube.

2. A method according to claim 1, wherein heating the Taylor bubble includes heating the outside of the evaporator tube.

3. A method according to claim 2, wherein heating the outside of the evaporator tube further comprising using compressed vapor to heat the outside of the evaporator tube.

4. A method according to claim 3, further comprising condensing the compressed vapor on the outside of the evaporator tube to form condensed distillate output.

\* \* \* \* \*